(12) United States Patent
Lokkinen

(10) Patent No.: US 9,920,872 B2
(45) Date of Patent: Mar. 20, 2018

(54) RENOVATION LINER, AND METHOD FOR INSTALLING RENOVATION LINER TO PIPEWORK

(71) Applicant: Picote Oy Ltd., Porvoo (FI)

(72) Inventor: Mika Lokkinen, Porvoo (FI)

(73) Assignee: PICOTE OY LTD., Porvoo (FI)

( * ) Notice: Subject to any disclaimer, the term of this patent is extended or adjusted under 35 U.S.C. 154(b) by 9 days.

(21) Appl. No.: 14/909,454

(22) PCT Filed: Jul. 18, 2014

(86) PCT No.: PCT/FI2014/050586
§ 371 (c)(1),
(2) Date: Feb. 1, 2016

(87) PCT Pub. No.: WO2015/018972
PCT Pub. Date: Feb. 12, 2015

(65) Prior Publication Data
US 2016/0195211 A1  Jul. 7, 2016

(30) Foreign Application Priority Data
Aug. 6, 2013 (FI) .................................. 20135818

(51) Int. Cl.
*F16L 55/16* (2006.01)
*F16L 55/165* (2006.01)
(Continued)

(52) U.S. Cl.
CPC ...... *F16L 55/1656* (2013.01); *B29C 63/0073* (2013.01); *B29C 63/34* (2013.01); *F16L 55/1654* (2013.01); *F16L 55/179* (2013.01); *B29K 2067/00* (2013.01); *B29L 2023/22* (2013.01); *E03F 2003/065* (2013.01)

(58) Field of Classification Search
USPC .................. 138/97, 98; 405/150.1, 184.2
See application file for complete search history.

(56) References Cited

U.S. PATENT DOCUMENTS 3,662,045 A * 5/1972 Tierling .................. B29C 49/26
138/98
4,818,314 A * 4/1989 Brittain ................... B29C 63/34
138/105
(Continued)

FOREIGN PATENT DOCUMENTS

DE 102010002960 9/2011
FI 122524 3/2012
(Continued)

*Primary Examiner* — James Hook
(74) *Attorney, Agent, or Firm* — Fasth Law Offices; Rolf Fasth

(57) ABSTRACT

A renovation liner is installed in a pipework. More particularly, an end of the renovation liner is closed by an elastic end piece. The renovation liner is impregnated with a hardening impregnating agent. The renovation liner, together with its end piece, is slipped into a position in the pipework to be renovated. A pressure is provided and maintained in a space formed by the renovation liner and the elastic end piece in order to press the renovation liner against walls of the pipework until the impregnating agent of the renovation liner has hardened in shape. The elastic end piece is removed.

6 Claims, 3 Drawing Sheets

(51) Int. Cl.
  *F16L 55/179* (2006.01)
  *B29C 63/00* (2006.01)
  *B29C 63/34* (2006.01)
  *E03F 3/06* (2006.01)
  *B29K 67/00* (2006.01)
  *B29L 23/00* (2006.01)

(56) References Cited

U.S. PATENT DOCUMENTS

| | | | |
|---|---|---|---|
| 5,451,284 A | 9/1995 | Ikeda et al. | |
| 5,752,786 A * | 5/1998 | Huikari | F16L 55/1652 138/97 |
| 5,765,597 A * | 6/1998 | Kiest, Jr. | B29C 63/36 138/97 |
| 5,944,058 A * | 8/1999 | Kamiyama | F16L 55/1651 138/97 |
| 5,964,249 A * | 10/1999 | Kiest, Jr. | B29C 63/0095 138/97 |
| 6,006,787 A | 12/1999 | Kamiyama et al. | |
| 6,105,619 A * | 8/2000 | Kiest, Jr. | B29C 63/36 138/97 |
| 6,199,591 B1 * | 3/2001 | Kiest, Jr. | B29C 63/36 138/97 |
| 6,416,692 B1 * | 7/2002 | Iwasaki-Higbee | F16L 55/164 138/97 |
| 6,619,886 B1 * | 9/2003 | Harrington | B29C 63/36 138/97 |
| 6,701,966 B1 | 3/2004 | Higman | |
| 8,375,972 B2 | 2/2013 | Kiest, Jr. | |
| 2003/0066567 A1 * | 4/2003 | Manners | F16L 55/1654 138/98 |
| 2004/0020544 A1 | 2/2004 | Kamiyama | |
| 2008/0169036 A1 | 7/2008 | Kamiyama et al. | |
| 2008/0236692 A1 | 10/2008 | Kiest | |
| 2009/0095355 A1 | 4/2009 | Kiest, Jr. | |
| 2009/0194183 A1 | 8/2009 | Kiest, Jr. | |
| 2011/0247755 A1 | 10/2011 | Sanders | |

FOREIGN PATENT DOCUMENTS

| | | |
|---|---|---|
| GB | 2273755 | 6/1994 |
| JP | 06210733 | 8/1994 |
| WO | 2011138508 | 11/2011 |

* cited by examiner

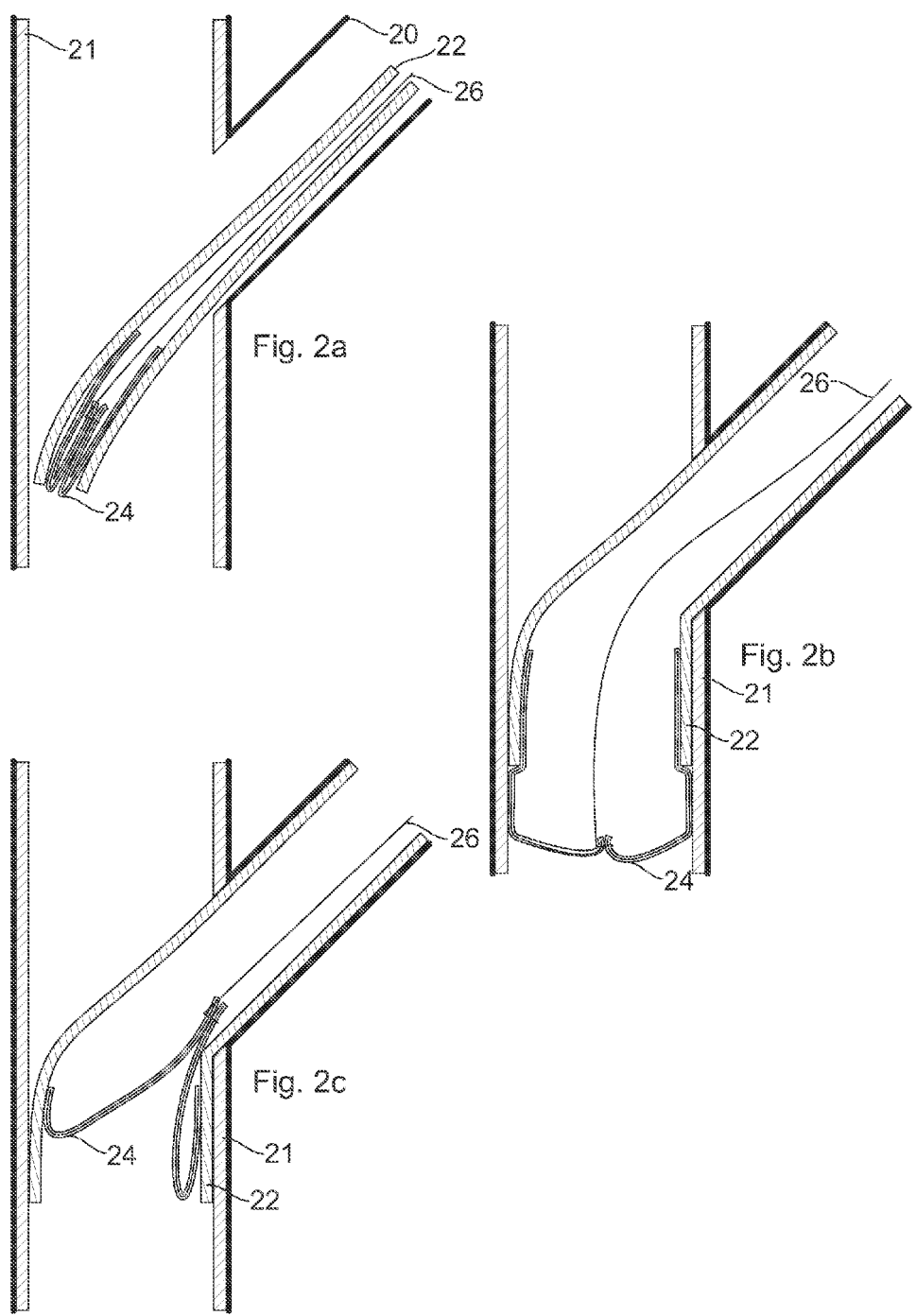

RENOVATION LINER, AND METHOD FOR INSTALLING RENOVATION LINER TO PIPEWORK

PRIOR APPLICATIONS

This is a US national phase patent application that claims priority from PCT/FI2014/050586 filed 18 Jul. 2014, that claims priority from Finnish Patent Application No. 20135818, filed 6 Aug. 2013.

BACKGROUND OF THE INVENTION

The invention relates to renovating pipeworks by utilizing a technique called lining, and to treating a renovation liner to be used in the renovation prior to renovating.

Pipes, for instance sewage pipes, may be renovated e.g. by coating the inner surface of a pipe with an appropriate coating material. One such coating material is a polyester sleeve impregnated with epoxy resin.

The polyester sleeve may be a covering called a "resizable liner" suitable for coating pipes having diameters of different thicknesses. The structure of the resizable liner is such that when necessary, it will stretch out to coat a pipe with a diameter thicker than the diameter of the liner normally (in a non-stretched state) is. Non-stretched, the diameter of the liner may be for instance 70 mm and, when stretched, 100 mm. Consequently, the same liner is suitable for coating the inner surface of both a 70 mm pipe and a 100 mm pipe.

The pipe assemblies to be coated may have joints at which a pipe having a thinner diameter is connected with a pipe having a thicker diameter. One such joint may, for instance, be provided in the sewage system of a residential building, e.g. a block of flats, wherein branch lines from the flats are provided with pipes with thin diameters, which are connected to a main line which has a thicker diameter. Presently, when coating such a joint, separate coating elements designed and dimensioned appropriately for the joint are used. These elements have turned out to be difficult to install in place such that the result meets the quality requirements set for the installation work. If a flaw occurs while installing an element and, for instance, the coating element sticks poorly to the joint, the element has to be removed from the joint for instance by grinding and subsequently replaced by a new coating element.

According to the prior art, it is also possible to coat the joint by utilizing a technique called overlap lining if both pipes of the pipe assembly are of the same thickness. In such a case, no separate coating element is necessary in the joint but the liner used for coating the branch line is extended by an appropriate length into the main line as well. When the coating liner has become attached to the branch and main lines once the epoxy resin has dried; the main line clogged by the coating liner is drilled open by an appropriate machining tool.

Finnish Patent No. 122524 discloses a method of treating a resizable liner. The document discloses a method of preparing a resizing sleeve for lining a jointing point of a pipe assembly comprising pipes of thicker and thinner diameter. The method comprises steps for stretching the diameter of the resizing sleeve to the diameter of the size of the thicker pipe of the pipe assembly, installing an installation hat according to the thicker pipe in diameter of the pipe assembly by airtightly gluing it onto the stretched resizing sleeve, and returning the resizing sleeve to the size of the thinner pipe in diameter of the pipe assembly to be lined.

A problem with the above-described arrangement is the physical size of the resizing sleeve treated, resulting from using in the installation hats and calibration sleeves fabric-base materials corresponding to the renovation liner. It prevents the method from being used for instance in a pipework which involves two resizing procedures in sequence or which is otherwise cramped for space. In addition, when renovating branch points, branch tees are necessary in order to make the branch tight.

BRIEF DESCRIPTION OF THE INVENTION

An object of the invention is thus to provide a method and a renovation liner to be used in the method so as to enable the aforementioned problems to be solved. The object of the invention is achieved by a method and a system which are characterized by what is disclosed in the independent claims. Preferred embodiments of the invention are disclosed in the dependent claims.

The invention is based on the idea that an open end of the renovation liner is closed prior to installation in the pipework by means of a thin, strong and extremely stretchable film, making the renovation liner thus treated easy to slip even through a small opening into the pipe to be renovated. Pressurized air is supplied into the renovation liner closed with the film, in which case the renovation liner is pressed against the walls of the pipe along its entire length and the film bulging out of the end of the renovation liner presses the end of the renovation liner against the wall of the pipe even at the branch points.

It has been discovered that the extremely stretchable film, together with the resizable liner, enable the renovation liner to be pressed against the walls also at the demanding branch points, which makes it possible to renovate the branch points by employing fewer work phases.

BRIEF DESCRIPTION OF THE FIGURES

The invention is now described in closer detail in connection with the preferred embodiments and with reference to the accompanying drawings, in which:

FIGS. 2a to 2c show method steps according to an embodiment of the invention when renovating a Y-joint by utilizing an overlap lining technique.

DETAILED DESCRIPTION OF THE INVENTION

Figure 1A:
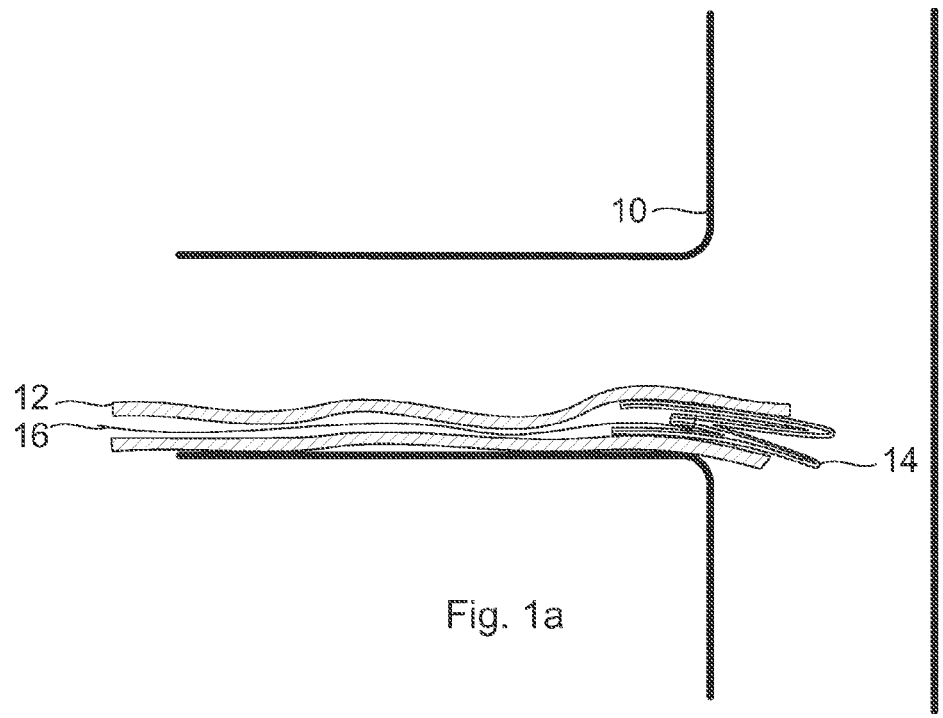
FIGS. 1a to 1d show method steps according to an embodiment of the invention when renovating a T-joint.

In the method according to the invention, a flexible and substantially airtight resizable end piece is attached to an open end of a renovation liner, for instance a polyester sleeve impregnated with epoxy resin. The renovation liner to be used may be a one-size renovation liner designed for a pipe of uniform thickness. The renovation liner to be used may also be a resizable liner also suitable for use in a pipework which comprises resizing procedures, such as that of altering the inner diameter of a pipe from 70 mm to 100 mm, in which case the resizable liner, non-stretched, suits the 70 mm pipe and, stretched, it suits the 100 mm pipe.

Preferably, the resizable end piece is attached for instance by gluing, taping or laminating it to the inner surface of the renovation liner. The attachment of the resizable end piece and, after installation, removal thereof may leave marks in the renovation liner, but the marks may be easily and quickly removed by grinding the attachment point. Preferably, the resizable end piece is made of a thinner material than the renovation liner. After attaching the resizable end piece, the renovation liner may be impregnated with a hardening impregnating agent, such as epoxy resin or another corresponding impregnating agent suitable for renovating a pipework.

In an embodiment, the resizable end piece is made of a material which is at least 0.25 mm and at most 5.0 mm thick, preferably at least 0.5 mm and at most 2 mm thick on the basis of the size of the pipe to be renovated or another requirement. The resizable end piece may be made of an elastic material which is non-breakably stretchable at least 50%, preferably at least 100%, and most preferably at least 150%. In an embodiment, the resizable end piece is treated such that it stretches in a longitudinal direction, i.e. in an axial direction of the renovation liner, less than in a width direction, i.e. in a direction perpendicular to the axis of the renovation liner. The longitudinal stretch may be restricted for instance by attaching to the surface of the resizable end piece, by gluing or laminating in the longitudinal direction, elongated strips made of the same material as or a different material than the resizable end piece. This may be performed afterwards on the complete film, or already while manufacturing the film. In such a case, a certain air pressure or liquid pressure causes a more extensive stretch in the width direction than in the longitudinal direction. In an embodiment, the resizable end piece is made substantially non-stretchable in the longitudinal direction. This is achieved by attaching in the longitudinal direction elongated strips of non-stretchable material, such as fabric or cord, to the surface of the resizable end piece. In an embodiment, the longitudinal stretch caused by air pressure is less than 50% of the stretch in the width direction.

In an embodiment, the resizable end piece is made of a planar polyurethane film provided substantially in the form of a pipe by gluing, taping or laminating. In an embodiment, the resizable end piece is made of elastic polyurethane film manufactured in a tubular form.

In an embodiment, the resizable end piece, between two elastic polyurethane films, is provided with a pipe mesh made up of threads in the longitudinal direction of the pipe mesh that run in a direction of the rotation axis of the pipe, as well as threads encircling the pipe mesh that are connected with the longitudinal threads. The threads encircling the pipe mesh, non-stretchable, wind and cover, mostly or almost completely, openings remaining between the longitudinal threads. The diameter of the pipe mesh may be increased easily by stretching the pipe mesh, and its diameter may be decreased easily by flattening the pipe mesh. In the longitudinal direction, however, the pipe mesh does not stretch longer than the longitudinal threads. Preferably, the pipe mesh is made of non-stretchable thread, for instance polyester or nylon thread, in which case the pipe mesh maintains approximately the diameter in which it is set. The elastic properties of the pipe mesh are very poor and caused by the mesh structure rather than the threads, so, in practice, the pipe mesh returns from its shape only slightly if the mesh is stretched or pressed to its extreme position. Preferably, one side of the polyurethane films attached to the inner and outer surfaces of the mesh is provided with a sticking or adhesive surface, so the film may be wound around the pipe mesh and cut into a length enabling an introductory end and a concluding end of the film to slightly overlap, in which case the film also sticks to itself, forming a seam with a double film, which makes the pipe to remain in the shape of a pipe also when stretched, not opening up on the side. The overlapping section may be for instance 5%, 10% or 1 to 20% of the circumference of the pipe non-stretched. In an embodiment, the overlapping section is about 100%, for instance 90 to 110% or 80 to 120%, which in practice enables a double wall strength to be achieved as the film sticks firmly to itself along the entire length of the pipe, in which case there is no risk that the seam might open upon stretching. On its inner surface the film sticks to the pipe mesh, but since the pipe mesh consists of straight and winding threads that are circular and partly overlapping and there is air between the threads, the sticking is not as strong as when the film sticks to itself over its entire overlapping surface area. The pipe mesh contains so much thread and so little air gaps between the threads that while collapsed, it prevents completely, almost completely or at least in part the adhesive or sticking surface of the film of the inner surface and the adhesive or sticking surface of the film of the outer surface from sticking to one another. When overpressure is applied to the renovation liner over the ambient air pressure for instance by supplying pressurized air to the renovation liner, the pipe expands. When the air pressure in the pipe to be pressurized is sufficiently high, the pipe expands to its full measure, i.e. the threads encircling the pipe mesh straighten up. Already while manufacturing the pipe mesh the purpose is to make the longitudinal threads straight, in which case the pipe mesh prevents the pipe from stretching in the longitudinal direction. In practice, the longitudinal threads may remain slightly winding, in which case the pipe may also stretch slightly in the longitudinal direction, but it is at least substantially non-stretchable, i.e. the stretch is for instance less than 5% or less than 3% of the non-stretched length, in which case the stretch has no significance in practice. An extensive stretch in the longitudinal direction could restrict the maximum stretch of the diameter in order to avoid breakage of the film. In such a case, the air pressure presses the inner film against the outer film, making the films stick firmly to one another by their opposite adhesive or sticking surfaces from inside the criss-cross formed by the threads of the pipe mesh. It is preferable to use an adhesive or sticking surface strong enough and/or elastic film weak enough to enable a pipe that has been expanded to its full measure to maintain its expanded shape even if the air pressure is dropped after a determined period of time to a level corresponding to that of the ambient air pressure.

The resizable end piece may also be made to have a shape required by the use application, such as the shape of a branch point in a pipework to be renovated. In an embodiment, the resizable end piece is made to have a tubular shape with a spherical expansion approximately in the middle of the tubular shape. In an embodiment, one end of the resizable end piece is tubular so as to enable it to be attached to the renovation liner while its other end is spherical or pouch-like in order for the resizable end piece to fill the joint to be renovated over as large an area as possible. In an embodiment, the thickness of the polyurethane film is at least 0.50 mm and at most 2 mm. In an embodiment, the material of the resizable end piece is polyurethane film arranged to withstand a pressure of at least 1, 3, 5 or 7 bar without breaking. In an embodiment, the material of the resizable end piece comprises elastic polyurethane film. In an embodiment, the material of the resizable end piece is elastic polyurethane film which is highly resistant to pressure, solvents as well as ultraviolet radiation. In an embodiment, the resizable end piece is made of polyurethane film onto which a support film is laminated to prevent the polyurethane film from stretching in one direction, for instance when installed in the manner described above on the end of the renovation liner, to prevent stretch in the longitudinal direction. The resizable end piece is preferably arranged to be disposable, in which case it may be removed from the renovated pipe after use, by applying force when necessary, for instance by tearing and grinding.

FIG. 1a shows a renovation liner 12 which has been prepared according to what has been disclosed above and which is about to be installed in a T-joint 10 of a pipework, wherein all pipes of the joint are of the same thickness. To the inner surface of the renovation liner 12 is attached a resizable end piece 14. The resizable end piece 14 is tubular, elastic and of the order of magnitude of the renovation liner in diameter, which makes it easy and quick to attach to the inner surface of the renovation liner in an airtight manner. In an embodiment, the tubular resizable end piece is provided with a variable diameter for instance such that the free end of the resizable end piece 14, which is not attached to the renovation liner 12, may be turned inwards, constricted and closed for instance with a cable tie, closure means or by tying a knot in the rope. To this closed end of the resizable end piece 14 a rope 16, cord, cable or a corresponding device is fastened to enable the resizable end piece to be closed also by knotting. Thus, the renovation liner 12 and the resizable end piece 14 form a closed, pouch-like entity which may be "slipped" into the pipe to be renovated, i.e. by means of air pressure, employing an inversion method and, when necessary, guiding by the rope 16, the renovation liner 12 and the resizable end piece 14 can be inserted into the entire length of the pipe to be renovated. In the situation of FIG. 1a, the renovation liner 12 and the resizable end piece 14 as well as the rope 16 fastened to the closed end of the resizable end piece reside at the installation site.

Figure 1B:
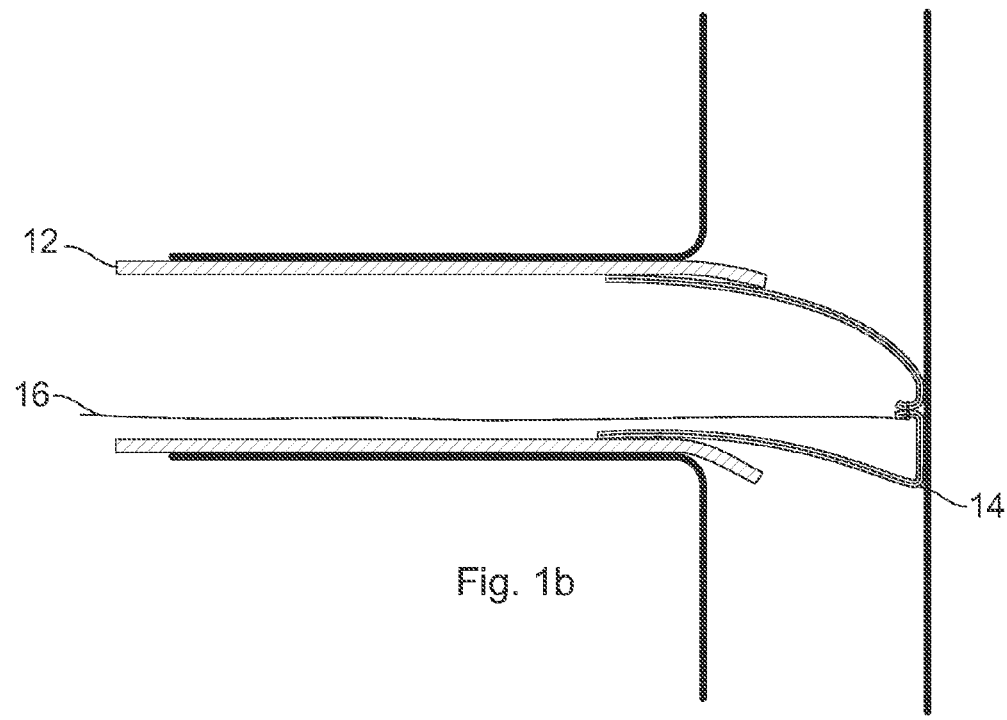

In FIG. 1b, the air pressure inside the renovation liner has been increased in comparison with the situation of FIG. 1a. It can be seen that due to the influence of air pressure, the renovation liner 12 has been pressed against the walls of the pipework and the resizable end piece 14 has been pushed out of the renovation liner 12, now residing in part against the wall of the vertical pipe of the T-joint.

Figure 1C:
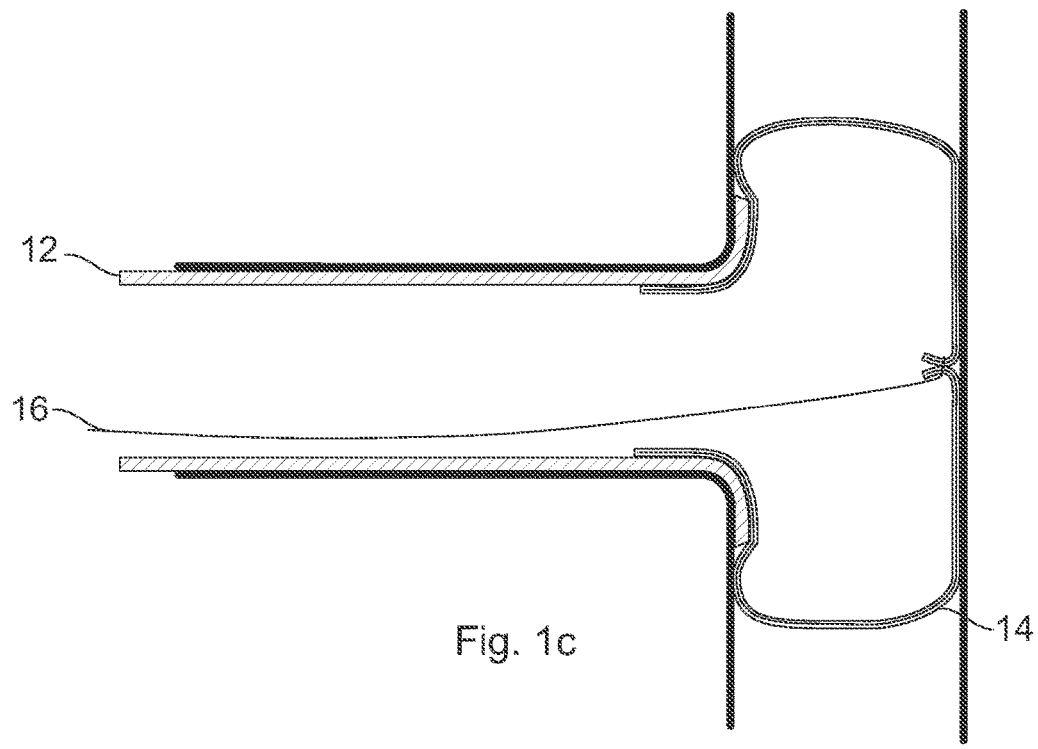

In FIG. 1c, the air pressure inside the renovation liner has been further increased in comparison with the situation of FIG. 1b. It can be seen that the renovation liner 12 still resides against the walls of the pipework and the resizable end piece 14 has expanded considerably since a high air pressure is created in the pouch-like space provided by the renovation liner 12 and the resizable end piece 14. In an embodiment, instead of pressurized air, also water may be used. The considerably expanded resizable end piece 14 spreads a concluding end of the renovation liner inserted by a distance from the horizontal pipe into the vertical pipe against the walls of the vertical pipe, in which case the end of the renovation liner 12 adapts a horn-like shape. The pressure is maintained in the system until the renovation liner 12 has hardened into shape, after which the pressure in the system may be lowered.

Figure 1D:
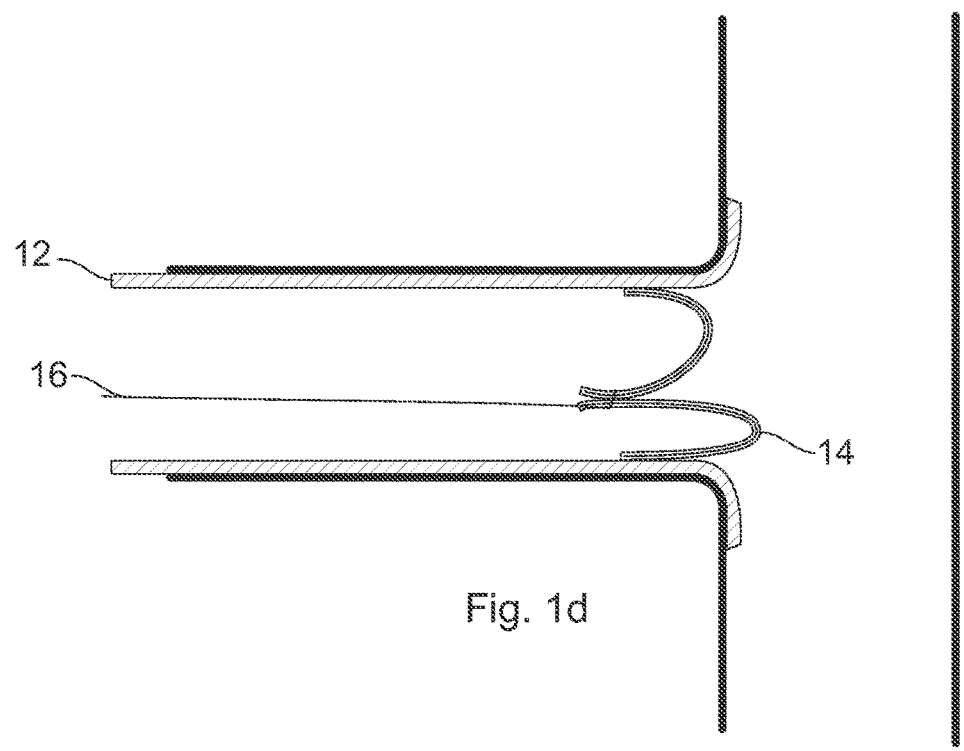

FIG. 1d shows a situation in which the renovation liner 12 has hardened against the inner surface of the pipe to be renovated, and the air pressure in the pouch-like space formed by the renovation liner 12 and the resizable end piece 14 has been lowered, and the resizable end piece 14 is being removed from the pipe by pulling at the rope 16. By pulling at the rope 16 sufficiently, the attachment between the resizable end piece 14 and the renovation liner 12 fails or the resizable end piece 14 breaks down, in which case a section of the resizable end piece connected to the rope 16 is removed from the pipe by pulling at the rope. The remains of the resizable end piece that have possibly stuck to the inner surface of the renovated pipe may be removed by gently grinding the inner surface of the pipe. The grinding may be carried out by prior art devices for grinding the inner surface of the pipe, through the same opening as that used for slipping the renovation liner 12 into the pipework. The end result achieved is a renovated branch pipe connected through the T-joint tightly to the vertical pipe. The vertical pipe may have been be renovated with a corresponding renovation liner prior to the renovation of the branch pipe disclosed herein, or it may be renovated only after renovating the branch pipe, in which case the branch pipe has to be reconnected to the vertical pipe by drilling, milling or grinding the renovation liner of the vertical pipe open at the branch.

FIG. 2a shows a renovation liner 22 which has been prepared according to what has been disclosed above and which is about to be installed by utilizing an overlap lining technique in a Y-joint 20 of a pipework, wherein the vertical pipe is thicker than the branch pipe connecting to the vertical pipe. This means that a resizable liner has to be used as a renovation liner 22 in order to make the renovation liner to be tightly pressed against the wall of both the branch pipe and the vertical pipe. In this example, the vertical pipe has been renovated with a renovation liner 21 prior to renovating the branch pipe. In order to open up the branch, part of the renovation liner installed in the vertical pipe has been removed where the vertical pipe and the branch pipe meet. To the inner surface of the renovation liner 22 is attached a resizable end piece 24. The resizable end piece 24 is tubular, elastic and of the order of magnitude of the renovation liner in diameter, which makes it easy and quick to attach to the inner surface of the renovation liner in an airtight manner. A free end of the resizable end piece 24, which is not attached to the renovation liner 22, may be turned inwards, constricted and closed for instance with a cable tie, closure means or by tying a knot in the rope. To this closed end of the resizable end piece 24 a rope 26, cord, cable or a corresponding device is fastened to enable the resizable end piece to be closed also by knotting. Thus, the renovation liner 22 and the resizable end piece 24 form a closed, pouch-like entity which may be "slipped" into the pipe to be renovated, i.e. by means of air pressure, employing an inversion method and, when necessary, guiding by the rope 26, the renovation liner 22 and the resizable end piece 24 can be inserted into the entire length of the pipe to be renovated. In the situation of FIG. 2a, the renovation liner 22 and the resizable end piece 24 as well as the rope 26 fastened to the closed end of the resizable end piece reside at the installation site. In an embodiment, the resizable end piece has a tubular section at both ends for fastening the resizable end piece to the renovation liner and for knotting the free end, as well as a spherical section between the tubular sections, the spherical section then residing at an end of the renovating liner 22 and pressing the ends against the edge of the pipework particularly efficiently.

In FIG. 2b, the air pressure inside the renovation liner has been increased in comparison with the situation of FIG. 2a. It can be seen that due to the influence of air pressure, the renovation liner 22 has been pressed against the walls of the pipework as well as against the already-installed renovation liner 21 of the vertical pipe. Also due to the influence of air pressure, the resizable end piece 24 has been pushed out of the renovation liner 22 and expanded considerably since a high air pressure is created in the pouch-like space provided by the renovation liner 22 and the resizable end piece 24. In an embodiment, instead of pressurized air, also water may be used. The considerably expanded resizable end piece 24 expands a concluding end of the resizable renovation liner 22 which overlaps by a distance from the branch pipe into the vertical pipe against the walls of the vertical pipe. On account of air pressure and its resizing properties, the renovation liner 22 takes up a shape according to the diameters of both the branch pipe and the vertical pipe, in which case the end of the renovation liner 22 is pressed tightly against the surface of the renovation liner 21 of the vertical pipe. The pressure is maintained in the system until the renovation liner 22 has hardened into shape, after which the pressure in the system may be lowered.

FIG. 2c shows a situation in which the renovation liner 22 has hardened against the inner surface of the pipe to be renovated, and the air pressure in the pouch-like space formed by the renovation liner 22 and the resizable end piece 24 has been lowered, and the resizable end piece 24 is being removed from the pipe by pulling at the rope 26. By pulling at the rope 26 sufficiently, the attachment between the resizable end piece 24 and the renovation liner 22 fails or the resizable end piece 24 breaks down, in which case a section of the resizable end piece connected to the rope 26 is removed from the pipe by pulling at the rope. The renovation is completed by opening up the vertical pipe by an appropriate drilling or grinding device, in which case the remains of the resizable end piece that have possibly stuck to the inner surface of the renovated pipe may at the same time be removed by gently grinding the inner surface of the pipe. The end result achieved is a renovated branch pipe connected through the Y-joint tightly to the vertical pipe.

It is apparent to a person skilled in the art that as technology advances, the basic idea of the invention may be implemented in many different ways. The invention and its embodiments are thus not restricted to the examples described above but may vary within the scope of the claims.

While the present invention has been described in accordance with preferred compositions and embodiments, it is to be understood that certain substitutions and alterations may be made thereto without departing from the spirit and scope of the following claims.

I claim:

1. A method of installing a renovation liner in a pipework, comprising:
    providing a pipework having a lateral pipe in fluid communication with a main pipe, the lateral pipe having an opened end defined therein terminating at the main pipe, closing an end of the renovation liner by an elastic end piece;
    impregnating the renovation liner with a hardening impregnating agent;
    slipping the renovation liner, together with the elastic end piece, into a position in the lateral pipe so that an outer end of the renovation liner sticks out and extends through the opened end of the lateral pipe and into the main pipe;
    providing and maintaining pressure in a space formed by the renovation liner and the elastic end piece in order to expand the renovation liner and the elastic end piece and pressing the renovation liner against an inner wall of the lateral pipe and pressing and bending the outer end of the renovation liner against an inner wall of the main pipe until the impregnating agent of the renovation liner has hardened in shape; and
    removing the elastic end piece.

2. The method as claimed in claim 1, wherein said elastic end piece is a tubular piece with one closed end having a rope attached thereto.

3. The method as claimed in claim 2, wherein the elastic end piece is removed by pulling at the rope.

4. The method as claimed in claim 1, wherein the elastic end piece is removed by pulling at the rope, and parts stuck to the renovation liner are removed by grinding.

5. The method as claimed in claim 1, wherein said elastic end piece is arranged to stretch at least 100% without breaking.

6. The method as claimed in claim 1, wherein said elastic end piece comprises elastic polyurethane film.

* * * * *